United States Patent
Arumugam et al.

(10) Patent No.: US 10,803,190 B2
(45) Date of Patent: Oct. 13, 2020

(54) AUTHENTICATION BASED ON CLIENT ACCESS LIMITATION

(71) Applicant: BlueTalon, Inc., Redwood City, CA (US)

(72) Inventors: Dilli Dorai Minnal Arumugam, Campbell, CA (US); Prasad Mujumdar, Fremont, CA (US); Pratik Verma, Hopkins, MN (US)

(73) Assignee: BlueTalon, Inc., Redmond, WA (US)

( * ) Notice: Subject to any disclaimer, the term of this patent is extended or adjusted under 35 U.S.C. 154(b) by 220 days.

(21) Appl. No.: 15/657,033

(22) Filed: Jul. 21, 2017

(65) Prior Publication Data

US 2018/0232531 A1 Aug. 16, 2018

Related U.S. Application Data

(60) Provisional application No. 62/457,772, filed on Feb. 10, 2017.

(51) Int. Cl.
*G06F 7/04* (2006.01)
*H04N 7/16* (2011.01)
(Continued)

(52) U.S. Cl.
CPC .......... *G06F 21/6218* (2013.01); *G06F 21/30* (2013.01)

(58) Field of Classification Search
USPC .......................................................... 726/30
See application file for complete search history.

(56) References Cited

U.S. PATENT DOCUMENTS

| 5,537,548 A | 7/1996 | Fin |
| 5,664,173 A | 9/1997 | Fast |

(Continued)

FOREIGN PATENT DOCUMENTS

WO    WO 2014/207554    12/2014

OTHER PUBLICATIONS

International Application No. PCT/US2016/065853, Notification of Transmittal of the International Search Report and the Written Opinion of the International Searching Authority, dated Mar. 24, 2017, 14 pages.

(Continued)

*Primary Examiner* — Wasika Nipa
*Assistant Examiner* — Samuel Ambaye
(74) *Attorney, Agent, or Firm* — Fiala & Weaver P.L.L.C.

(57) ABSTRACT

Systems, computer program products and methods implementing access control on a distributed file system are described. A file system enforcement point protects an HDFS from unauthorized access by authenticating a declared identity of a task submitting a request from a client. Upon receiving the request, the file system enforcement point submits a challenge to the client, requesting the task to provide credentials of the declared identity. The task submits credentials. On the client, each task has access to credentials of a true identity of the task. Accordingly, in case a task submits a claimed identity that is different from the true identity of the task, the task cannot submit correct credentials in response to the challenge. The file system enforcement point authenticates the declared identity using the submitted credentials. The file system enforcement point allows the client to access the HDFS only upon successful authentication.

20 Claims, 4 Drawing Sheets

(51) Int. Cl.
*G06F 21/62* (2013.01)
*G06F 21/30* (2013.01)

(56) References Cited

U.S. PATENT DOCUMENTS

| | | |
|---|---|---|
| 6,427,020 B1 | 7/2002 | Rhoads |
| 6,463,470 B1 | 10/2002 | Mohaban |
| 6,539,425 B1 | 3/2003 | Stevens |
| 6,687,229 B1 | 2/2004 | Kataria |
| 6,694,306 B1 | 2/2004 | Nishizawa et al. |
| 6,820,082 B1 | 11/2004 | Cook et al. |
| 7,542,943 B2 | 6/2009 | Caplan |
| 7,577,834 B1 | 8/2009 | Traversal |
| 7,631,084 B2 | 12/2009 | Thomas |
| 7,730,089 B2 | 6/2010 | Campbell |
| 8,181,221 B2 | 5/2012 | Manickam et al. |
| 8,613,108 B1 | 12/2013 | Aggarwal |
| 8,677,447 B1 | 3/2014 | Zuk et al. |
| 9,071,594 B2 | 6/2015 | Boulos et al. |
| 9,804,866 B2 | 10/2017 | Halls et al. |
| 9,866,592 B2 | 1/2018 | Arumugam et al. |
| 9,871,825 B2 | 1/2018 | Arumugam et al. |
| 2002/0007404 A1 | 1/2002 | Vange |
| 2002/0019828 A1 | 2/2002 | Mortl |
| 2002/0031230 A1 | 3/2002 | Sweet |
| 2002/0055921 A1 | 5/2002 | Yoshimura et al. |
| 2002/0169907 A1 | 11/2002 | Candea |
| 2003/0018786 A1 | 1/2003 | Lortz |
| 2003/0021283 A1 | 1/2003 | See |
| 2003/0046315 A1 | 3/2003 | Feig |
| 2003/0115322 A1 | 6/2003 | Moriconi |
| 2004/0054791 A1 | 3/2004 | Chakraborty |
| 2004/0073668 A1 | 4/2004 | Bhat |
| 2004/0088560 A1 | 5/2004 | Danks |
| 2004/0172546 A1* | 9/2004 | Vasudevan .......... H04L 63/0428 713/189 |
| 2004/0225643 A1 | 11/2004 | Alpha et al. |
| 2005/0021978 A1 | 1/2005 | Bhat |
| 2005/0091212 A1 | 4/2005 | Mohamed et al. |
| 2005/0289342 A1 | 12/2005 | Needham et al. |
| 2006/0053216 A1 | 3/2006 | Deokar |
| 2007/0124797 A1 | 5/2007 | Gupta |
| 2007/0168364 A1 | 7/2007 | Douceur et al. |
| 2007/0174831 A1 | 7/2007 | Lee |
| 2007/0234408 A1 | 10/2007 | Burch |
| 2008/0046462 A1 | 2/2008 | Kaufman et al. |
| 2008/0065591 A1 | 3/2008 | Guzenda |
| 2008/0077809 A1 | 3/2008 | Hayler |
| 2008/0263358 A1 | 10/2008 | Alme |
| 2008/0301437 A1 | 12/2008 | Chevalier |
| 2009/0049512 A1 | 2/2009 | Manickam et al. |
| 2009/0064307 A1 | 3/2009 | Holar |
| 2009/0193493 A1 | 7/2009 | Becker |
| 2010/0024019 A1 | 1/2010 | Backlund |
| 2010/0235396 A1 | 9/2010 | Chaurasia et al. |
| 2010/0281524 A1 | 11/2010 | Ghittino |
| 2010/0325097 A1 | 12/2010 | Er et al. |
| 2011/0141124 A1 | 6/2011 | Halls et al. |
| 2011/0209194 A1 | 8/2011 | Kennedy |
| 2012/0054217 A1 | 3/2012 | Clarke |
| 2012/0117644 A1 | 5/2012 | Soeder |
| 2012/0198467 A1 | 8/2012 | Jackson |
| 2013/0060905 A1 | 3/2013 | Mickens |
| 2013/0091173 A1 | 4/2013 | Pooley et al. |
| 2013/0091355 A1 | 4/2013 | Lear et al. |
| 2013/0246796 A1 | 9/2013 | Lichtenstadt et al. |
| 2013/0332982 A1 | 12/2013 | Rao et al. |
| 2014/0047227 A1 | 2/2014 | Breternitz et al. |
| 2014/0052749 A1 | 2/2014 | Rissanen et al. |
| 2014/0068699 A1 | 3/2014 | Balacheff |
| 2014/0090085 A1* | 3/2014 | Mattsson ............ G06F 21/6227 726/28 |
| 2014/0101713 A1 | 4/2014 | Entin et al. |
| 2014/0128053 A1 | 5/2014 | Merchant |
| 2014/0163948 A1 | 6/2014 | Daly et al. |
| 2014/0189808 A1* | 7/2014 | Mahaffey ............ H04L 63/083 726/4 |
| 2014/0196115 A1 | 7/2014 | Pelykh |
| 2014/0317226 A1 | 10/2014 | Resch |
| 2014/0351573 A1 | 11/2014 | Martini |
| 2015/0058480 A1 | 2/2015 | Allgaier et al. |
| 2015/0113010 A1* | 4/2015 | Muthyala ............ G06F 16/116 707/756 |
| 2015/0128205 A1 | 5/2015 | Mahaffey |
| 2015/0304110 A1 | 10/2015 | Oberheide |
| 2016/0085962 A1 | 3/2016 | Sokolov et al. |
| 2016/0088006 A1 | 3/2016 | Gupta |
| 2016/0119349 A1 | 4/2016 | Wang et al. |
| 2016/0149859 A1 | 5/2016 | Curtis |
| 2016/0197789 A1 | 7/2016 | Lai |
| 2016/0205101 A1 | 7/2016 | Verma et al. |
| 2016/0342803 A1 | 11/2016 | Goodridge |
| 2017/0012962 A1 | 1/2017 | Lissack |
| 2017/0091772 A1 | 3/2017 | Piel |
| 2017/0093925 A1 | 3/2017 | Sheretov |
| 2017/0111336 A1 | 4/2017 | Davis |
| 2017/0208033 A1 | 7/2017 | Roskind |
| 2018/0131726 A1 | 5/2018 | Arumugam et al. |
| 2018/0131727 A1 | 5/2018 | Arumugam et al. |
| 2018/0157560 A1 | 6/2018 | Gochkov |

OTHER PUBLICATIONS

PCT International Search Report in International Application No. PCT/US2018/017698, dated May 21, 2018, 3 pages.
International Application No. PCT/US2016/054107, Notification of Transmittal of the International Search Report and the Written Opinion of the International Searching Authority, dated Jan. 9, 2017, 13 pages.
International Search Report Application No. PCT/US2016/012433, dated Mar. 11, 2016, 2 pgs.
International Search Report Application No. PCT/US2016/012435, dated Mar. 11, 2016, 2 pgs.
International Search Report and Written Opinion issued to international patent Application No. PCT/US2016/012429, dated Mar. 31, 2016, 6 pgs.

* cited by examiner

400

```
┌─────────────────────────────────────────────┐
│ Receiving, by a file system enforcement     │
│ point from a file system client, a request  │
│ to access a distributed file system, the    │
│ request being submitted by a task           │
│ associated with a declared identity         │
│                                         402 │
└─────────────────────────────────────────────┘
                      ↓
┌─────────────────────────────────────────────┐
│ Submitting, by the file system enforcement  │
│ point to the file system client, a          │
│ challenge to access client credentials      │
│ associated with the declared identity       │
│                                         404 │
└─────────────────────────────────────────────┘
                      ↓
┌─────────────────────────────────────────────┐
│ Retrieving a response to the challenge by   │
│ the file system enforcement point from the  │
│ file system client, the response            │
│ including the credentials                   │
│                                         406 │
└─────────────────────────────────────────────┘
                      ↓
┌─────────────────────────────────────────────┐
│ Authenticating the declared identity by the │
│ file system enforcement point using the     │
│ retrieved credentials                       │
│                                         408 │
└─────────────────────────────────────────────┘
                      ↓
┌─────────────────────────────────────────────┐
│ Allowing the request to access the          │
│ distributed file system upon successful     │
│ authentication                              │
│                                         410 │
└─────────────────────────────────────────────┘
```

FIG. 4

AUTHENTICATION BASED ON CLIENT ACCESS LIMITATION

CROSS REFERENCE TO RELATED APPLICATIONS

This application is a non-provisional of and claims priority to U.S. Provisional Patent Application No. 62/457,772, filed on Feb. 10, 2017, the entire contents of which are hereby incorporated by reference.

BACKGROUND

Apache® Hadoop® is a system configured to store and processing data using a distributed computing framework. In Apache Hadoop, files can be stored in a Hadoop Distributed File System (HDFS). The HDFS is a distributed file system that can be deployed on multiple off-the-shelf computers. The computers are designated as nodes organized in one or more clusters. The nodes in an HDFS cluster include a name node and multiple data nodes. The data nodes are configured to serve read and write requests from clients of the HDFS cluster. The name node is configured to manage the cluster, including controls access to the files on the data nodes by the clients.

Security governance of an HDFS cluster can include authentication and authorization. Authentication can include determining whether a user submitting a request to the HDFS cluster is who the user claims to be. Authorization can include determining what actions an authenticated user can perform in the HDFS cluster.

SUMMARY

In general, this specification relates to data security and access control.

Systems, computer program products and methods implementing access control on a distributed file system are described. A file system enforcement point protects an HDFS from unauthorized access by authenticating a declared identity of a task submitting a request from a client. Upon receiving the request, the file system enforcement point submits a challenge to the client, requesting the task to provide credentials of the declared identity. The task submits credentials. On the client, each task has access to credentials of a true identity of the task. Accordingly, in case a task submits a claimed identity that is different from the true identity of the task, the task cannot submit correct credentials in response to the challenge. The file system enforcement point authenticates the declared identity using the submitted credentials. The file system enforcement point allows the client to access the HDFS only upon successful authentication.

Particular embodiments of the subject matter described in this specification can be implemented to realize one or more of the following example advantages. Conventionally, authenticating a request to access an HDFS may be too weak or too complex. The disclosed techniques provide simple and effective authentication using inherent security measures of a client system. Accordingly, no external add-on authentication, which may add complexity, is needed.

The disclosed techniques can harden a distributed file system using Linux based security. Accordingly, the disclosed techniques make attacks on the distributed file system unachievable.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

FIG. 4 is a flowchart of an example process of authentication based on client access limitations.

Like reference numbers and designations in the various drawings indicate like elements.

DETAILED DESCRIPTION

Figure 1:
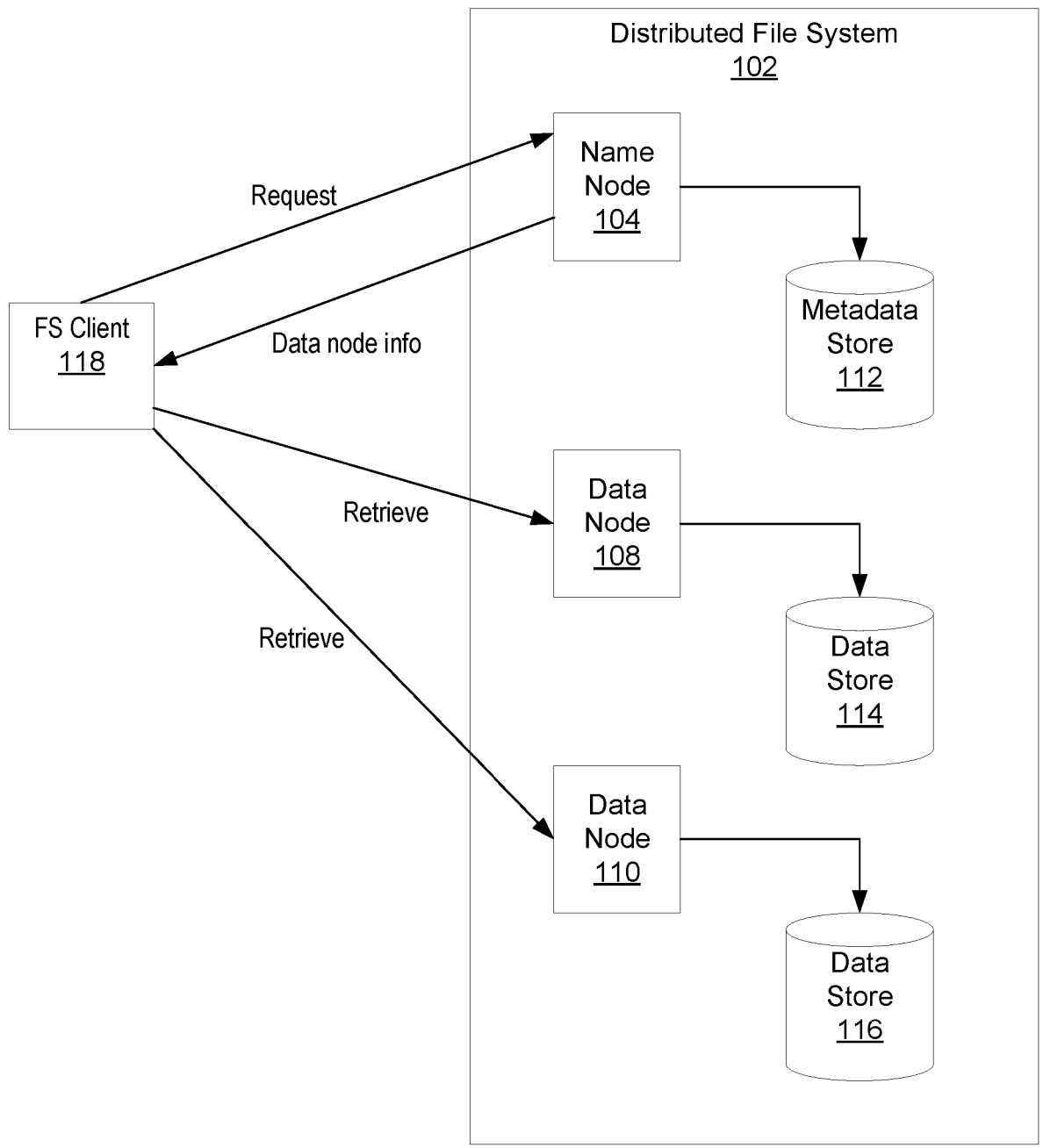
FIG. 1 is a block diagram illustrating conventional data access control techniques of an example distributed file system.

FIG. 1 is a block diagram illustrating conventional data access control of an example distributed file system 102. The distributed file system 102 can be an HDFS. The distributed file system 102 includes multiple computers managing data stores. The computers are designated as nodes organized in a cluster. The distributed file system 102 includes a name node 104, a first data node 108 and a second data node 110. The name node 104 is associated with a metadata store 112 that stores system information. The data nodes 108 and 110 are associated with a first data store 114 and a second data store 116, respectively. The data stores 114 and 116 store data.

A file system client 118 is configured to access the data stored in the data stores 114 and 116. The file system client 118 can include one or more computers configured as compute nodes in a Hadoop system that performs map phase or reduce phase of data processing. The file system client 118 submits a request to the distributed file system 102. The request is associated with a declared identity, e.g., user Alice.

The name node 104 receives the request and authenticates the declared identity. Some example authentication techniques that the name node 104 can use include simple authentication and Kerberos authentication. In simple authentication, the name node 104 trusts the declared identity. The level of protection provided by simple authentication is low. In Kerberos authentication, the name node 104 authenticates the declared identity based on a ticket associated with the request. The file system client 118 can obtain the ticket from an authentication server upon authenticating itself to the authentication server. Kerberos authentication setup can be complex.

Upon authentication, the name node 104 provides data node information to the file system client 118. The data node information can include, for example, references to the data nodes 108 and 110 where the requested data is stored. The file system client 118 can access the data according to the data access information.

Figure 2:
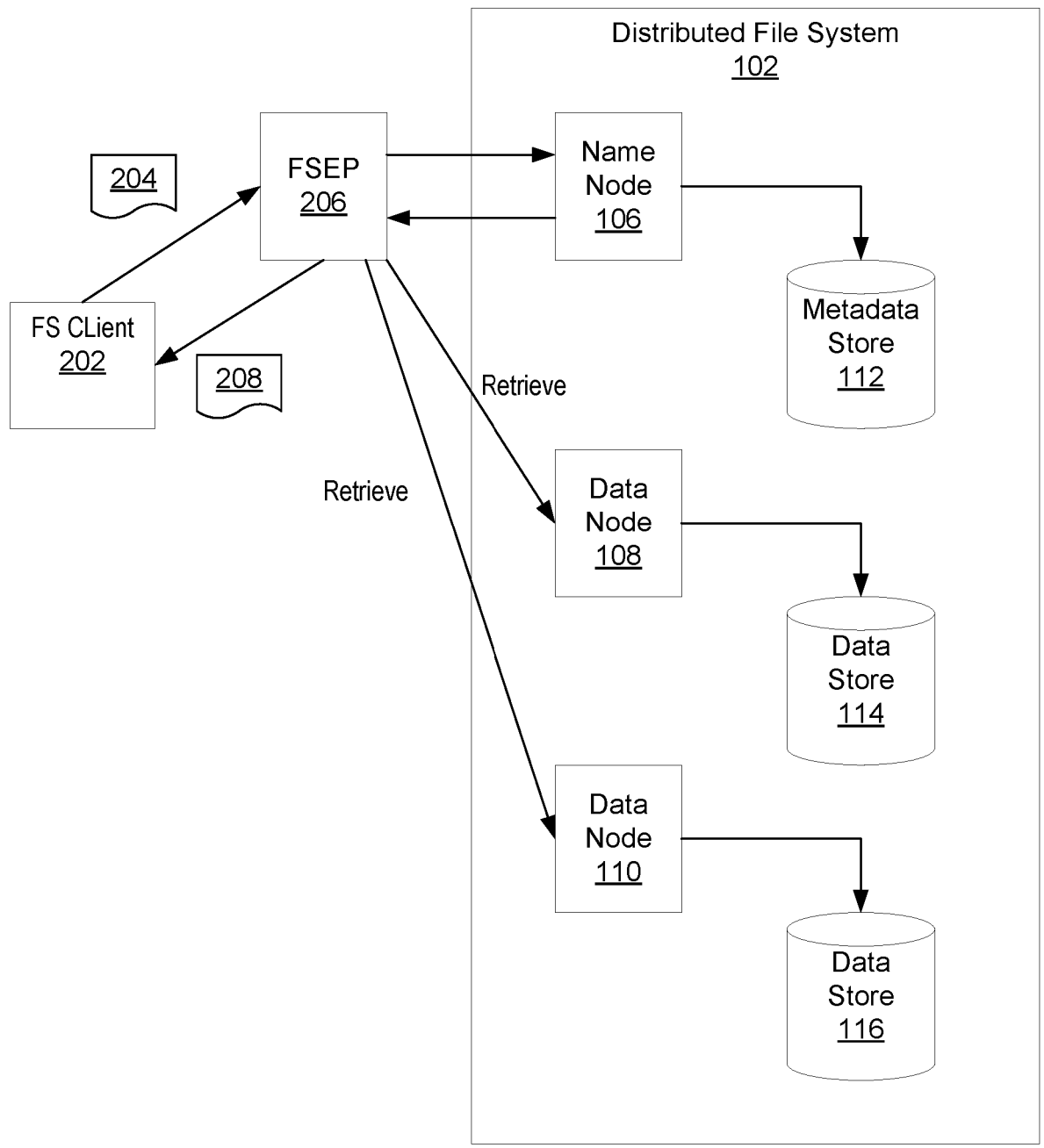
FIG. 2 is a block diagram illustrating example data access control techniques of authentication based on client access limitations.

FIG. 2 is a block diagram illustrating example data access control techniques of authentication based on client access limitations. A file system client 202, being a client of the distributed file system 102, submits a request 204 to the distributed file system 102 to access data stored on the distributed file system 102. The request 204 is associated with a declared identity, e.g., user Alice.

A file system enforcement point 206 acts as an intermediary between the file system client 202 and the distributed file system 102. The file system enforcement point 206 includes one or more computers configured to perform authentication based on client access limitations in addition to, or instead of, the simple and/or Kerberos authentication performed by the name node 104 of the distributed file system 102.

The file system enforcement point 206 receives the request 204 and issues a challenge 208 to the file system client 202. The challenge 208 can be a secured HTTP request. The challenge 208 requests the file system client 202 to provide credentials corresponding to the declared identity associated with the request 204. The file system enforcement point 206 trusts the file system client 202 to be able to provide only credentials associated with true identities. For example, when the declared identity is Alice, the challenge 208 requests the file system client 202 to provide credentials associated with Alice. The file system enforcement point 206 trusts the file system client 202 not to provide credentials of a different user Bob.

The file system enforcement point 206 receives the credentials from the file system client 202 in response to the challenge 208. The file system enforcement point 206 then authenticates the declared identity Alice by verifying that the credentials indeed correspond to the declared identity Alice. Upon successful authentication, the file system enforcement point 206 forwards the request 204 to the name node 104. The name node 104 provides data node information to file system client 202 directly or through the file system enforcement point 206. The file system client 202 can then use the data node information to access the data through the file system enforcement point 206, directly or through additional authentication.

In the example shown, the file system enforcement point 206 is implemented outside of the distributed file system 102. In various implementations, the file system enforcement point 206 can be incorporated into the distributed file system 102.

Figure 3:
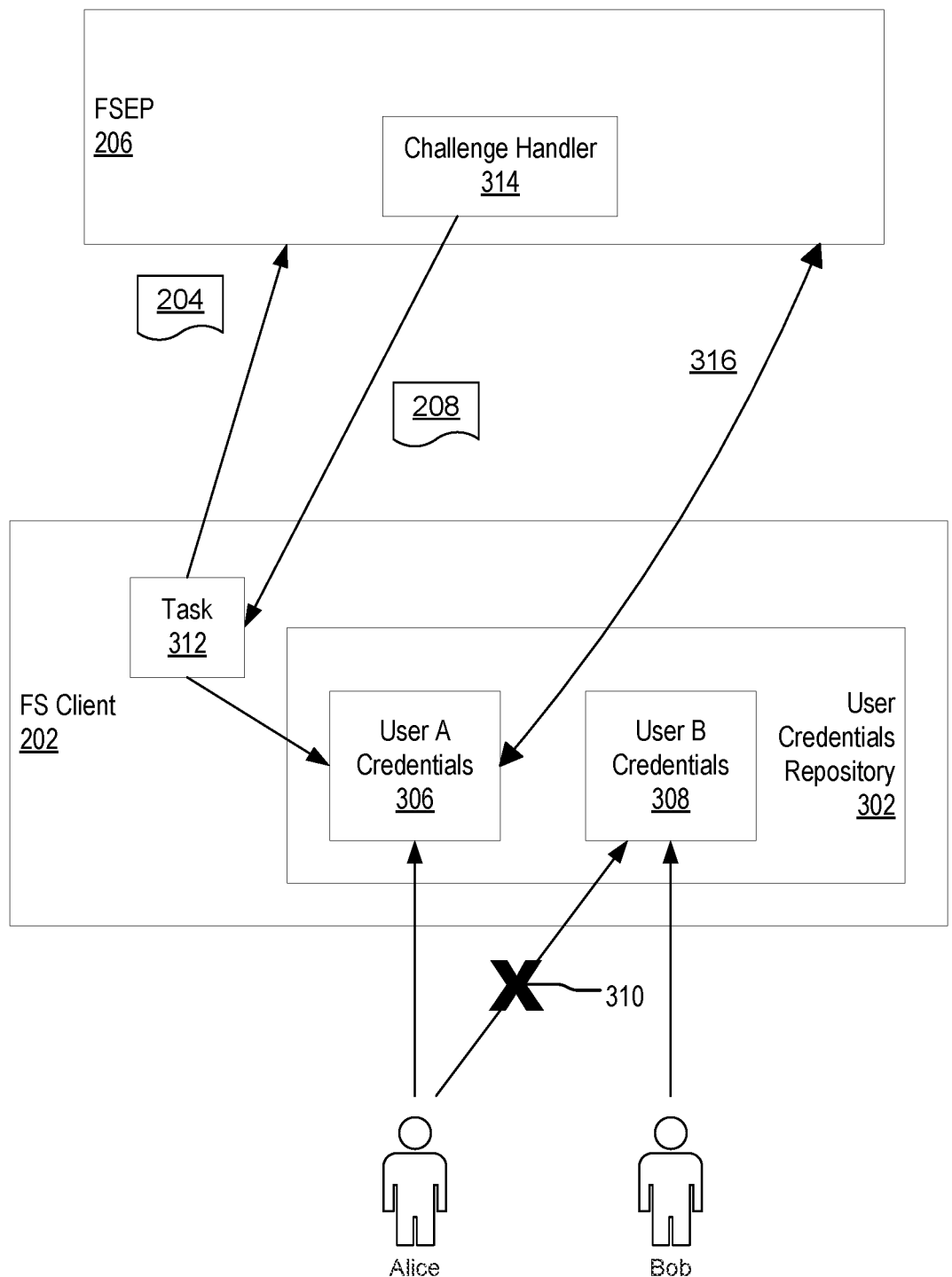
FIG. 3 is a block diagram illustrating an example file system client.

FIG. 3 is a block diagram illustrating an example file system client 202. The file system client 202 includes one or more computers. The file system client 202 can be a compute node in a Hadoop system. The file system client 202 includes, or communicates with, a user credential repository 302. The user credential repository 302 stores user credentials, e.g., encrypted password or other secrets, that can be used to authenticate a user. In the example shown, the user credential repository 302 stores first user credentials 306 for a first user, e.g., Alice. The user credential repository 302 stores second user credentials 308 for a second user, e.g., Bob. A user, e.g., Alice or Bob, can correspond to a record in a registered user list of the file system client 202. For example, each user can correspond to a line in a .passwd file in a UNIX or Linux based system.

The user credential repository 302 guarantees only an account having super user privileges or an owner of given credentials can access the given credentials. An account having super user privileges can be an administrator account, a system root, or in case of UNIX or UNIX-like systems, an account having an account identifier of zero.

In this example, the user credential repository 302 can store the first user credentials 306 for user Alice in a path /home/Alice/.fsep_user_secret, where only user Alice and the super user has read access to the directory /home/Alice. Likewise, the user credential repository 302 can store the second user credentials 308 in a path /home/Bob/.fsep_user_secret, where only user Bob and the super user has read access to the directory /home/Bob. Accordingly, for example, the user credential repository 302 blocks (316) an attempt by user Alice to access the second user credentials 308 for user Bob.

The directories /home/Alice and /home/Bob can be home folders of users Alice and Bob, respectively. The home folders can be created when the users log in. In the example shown, the file .fsep_user_secret in each path stores corresponding user secrets that a file system enforcement point 206 can use to authenticate a declared identity. The user secrets can be tokens generated by an automatic password generator application, e.g., Linux apg, using script initiated when users log in.

When the file system client 202 submits a request 204 to the file system enforcement point 206, the request 204 is submitted by a task 312. The task 312 is a process associated with a true identity, e.g., Alice. The request 204 can be associated with a declared identity. The declared identity should be the same as the true identity. In an attack, the request 204 may have been submitted by a task associated with true identity Alice but claiming to be Bob. In this situation, the declared identity is Bob.

The file system enforcement point 206 includes a challenge handler 314. The challenge handler 314 is a component of the file system enforcement point 206 configured to generate a challenge 208 in response to the request 204. Generating the challenge 208 can include determining the declared identity associated with the request 204 and generating a secured HTTP request for inquiring the task 312. The challenge handler 314 submits the challenge 208 to the file system client 202. The challenge 208 requests the task 312 to provide credentials associated with the declared identity.

The task 312 can only access credentials of the true identity associated with the task 312. In this example, the task 312 can only access the first user credentials 306 associated with Alice. The task 312 cannot access the second user credentials 308 associated with user Bob. Accordingly, in the case that the declared identity Alice is the same as the true identity Alice, the task 312 is able to retrieve the first user credentials 306 associated with Alice, and provide the first user credentials 306 to the file system enforcement point 206 for authentication. In the case that the declared identity Bob is different from the true identity Alice, the task 312 is unable to retrieve the second user credentials 308 associated with Bob. Accordingly, the authentication of the declared identity Bob will fail.

The task 312 can insert a user name and the credentials in a response to the challenge from the file system enforcement point 206. The response can include a command line connection command for connecting to the file system enforcement point 206, for example, in a curl command shown below.

curl-i-u Alice:[credentials]http://[link to FSEP 206]  (1)

The file system enforcement point 206 can then authenticate the declared identity Alice. The file system enforcement point 206 retrieves, as a super user, the first user credentials 306 from the home folder /home/Alice of the user name provided in the response. The file system enforcement point 206 compares the retrieved first user credentials 306 with the credentials provided in the response. The file system enforcement point 206 authenticates the declared identity upon determining that the two credentials match.

In some implementations, the task 312 submits the request 204 to the file system enforcement point 206 with a declared identity, e.g., Alice, and credentials alleged to be associated with the declared identity. The file system enforcement point 206, in response, communicates (316) with the file system client 202 and accesses the home folder of the declared identity. The file system enforcement point 206 retrieves the first user credentials 306 from the home folder. The file system enforcement point 206 compares the retrieved first user credentials 306 with the credentials submitted by the task 312. The system enforcement point 206 authenticates the declared identity upon determining that the first user credentials 306 retrieved from the home folder matches the submitted credentials.

FIG. 4 is a flowchart of an example process 400 of authentication based on client access limitations. The process 400 can be performed by a system that includes a distributed file system, a file system client, e.g., the file system client 202 of FIG. 2, and a file system enforcement point, e.g., the file system enforcement point 206 of FIG. 2, that includes one or more computers. The distributed file system can be an HDFS. The file system client can be a compute node of a distributed computing system.

The file system enforcement point receives (402), from the file system client, a request to access a distributed file system. The request is submitted by a task associated with a declared identity. The request can be a data query for retrieving or modifying data on the distributed file system, or a request to initiate a session between file system client and the distributed file system.

The file system enforcement point submits (402) to the file system client a challenge to access credentials associated with the declared identity. The credentials are stored in a storage system in a path that is accessible only by a super user or by a task being associated with a true identity that matches the declared identity. The challenge requests the task associated with the declared identity to access credentials associated with the declared identity. The path can be a credential path, e.g., a directory storing credentials, among multiple credential paths storing credentials of corresponding users. The task being associated with the true identity is prevented, by the file system client, from accessing another credential path. The path can include one or more file directory names.

The file system enforcement point receives (406) a response to the challenge from the file system client. The response includes the credentials retrieved at the path by the task associated with the declared identity. The response can be provided by the task. If the task fails to provide the response, the file system enforcement point blocks the request.

The file system enforcement point authenticates (408) the declared identity using the retrieved credentials. Authenticating the declared identity can include the following operations. The file system enforcement point 206 can retrieve, as a super user, the credentials stored in the path. The file system enforcement point 206 compares the retrieved credentials with the credentials in the response. The file system enforcement point 206 can authenticate the declared identity upon determining that the retrieved credentials match the credentials in the response.

The authentication can occur for each data query, or for each session between the file system client and the distributed file system. The file system enforcement point allows (410) the request to access the distributed file system only upon successful authentication. The file system enforcement point 206 blocks the request if the authentication is unsuccessful, e.g., when the task provided credentials that are not associated with the declared identity, or when the retrieved credentials does not match the credentials in the response.

In some implementations, a file system enforcement point receives from a file system client a first request to access a distributed file system. The request is associated with a declared identity and alleged credentials of the declared identity.

The file system enforcement point submits, to a credentials storage system, a second request to access true credentials associated with the declared identity. The true credentials are protected by a security measure provided by the credentials storage system. The credentials storage system can be the file system client or another system. The credentials storage system includes a directory of the declared identity. Access to the directory is limited, by the security measure, only to the declared identity or a super user. The security measure is specified by an operating system of the credentials storage system.

The file system enforcement point receives, from the credentials storage system, a response to the second request. The response includes the true credentials associated with the declared identity.

The file system enforcement point allows the first request to access the distributed file system upon authenticating the declared identity by the file system enforcement point using the retrieved true credentials against the alleged credentials.

In some implementations, a file system enforcement point receives, from a file system client, a request to access a distributed file system, the request being associated with a declared identity and alleged credentials of the declared identity.

The file system enforcement point forwards, to an external system, the alleged credentials associated with the declared identity as well as the declared identity. The external system is configured to authenticate the declared identity by determining a match of alleged credentials against true credentials of the declared identity stored in external system. The external system can be the file system client, or a computer system that is different from the file system client and the file system enforcement point.

The file system enforcement point receives a response from the external system indicating whether the alleged credentials match stored credentials. Based on the file system enforcement point can forward, to the file system client, an error message in the response in case the declared identity is not authenticated by the external system. Or, the file system enforcement point can allow the request to access the distributed file system in case the response indicates that the declared identity is authenticated. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method in a file system enforcement point, comprising:
   receiving a request from a file system client to access a distributed file system, the request associated with a declared identity;
   submitting a challenge to the file system client instructing the file system client to retrieve credentials associated with the declared identity, the credentials being stored at a user credential repository in a path that is accessible only by tasks associated with an account having super user privileges and by tasks associated with the declared identity;
   receiving a response to the challenge from the file system client, the response including the credentials retrieved by the file system client from the user credential repository;
   retrieving the credentials stored at the user credential repository using a task associated with an account having super user privileges;
   comparing the retrieved credentials with the credentials in the response; and
   allowing the file system client to access the distributed file system when the retrieved credentials match the credentials in the response.

2. The method of claim 1, wherein the distributed file system is a Hadoop Distributed File System (HDFS), and the file system client is a compute node of a distributed computing system.

3. The method of claim 1, wherein the steps of retrieving and comparing occur once per access session.

4. The method of claim 1, wherein the credentials associated with the declared identity are stored in the user credential repository at a credential path corresponding to the declared identity, the credential path being one of a plurality credential paths each storing credentials corresponding to a unique identity, and the tasks associated with the declared identity are prevented from accessing the credential paths of the plurality of credential paths that do not correspond to the declared identity.

5. The method of claim 4, wherein the credential path includes one or more file directory names.

6. A method in a file system enforcement point, the method comprising:
   receiving a first request from a file system client to access a distributed file system, the request being associated with a declared identity and including purported credentials of the declared identity and wherein true credentials for the declared identity are accessible in a credentials storage system only by tasks associated with an account having super user privileges and by tasks associated with the declared identity;
   using a task associated with a super user, retrieving the true credentials from the credentials storage system;
   comparing the true credentials with the purported credentials; and
   allowing the file system client to access the distributed file system when the true credentials match the purported credentials.

7. The method of claim 6, wherein the credentials storage system includes a directory corresponding to the declared identity and which contains the true credentials, wherein access to the directory is limited by a security measure to only tasks associated with the declared identity or the super user, and wherein the security measure is enforced by an operating system of the credentials storage system.

8. The method of claim 7, wherein the credentials storage system is a portion of the file system client.

9. A method in a file system enforcement point, comprising:
   receiving from a file system client, a request to access a distributed file system, the request being associated with a declared identity and including purported credentials of the declared identity and wherein true credentials for the declared identity are accessible in an external system only by tasks associated with a super user and by tasks associated with the declared identity;
   forwarding the purported credentials to the external system, the external system being configured to:
     using a task associated with a super user, access the true credentials that are stored in the external system;
     compare the purported credentials to the true credentials; and
     determine a match when the purported credentials and the true credentials are the same:
   receiving a response from the external system indicating whether a match was determined; and
   based on the response:
     sending an error message to the file system client when the response indicates a match was not determined; or
     allowing the file system client to access the distributed file system when the response indicates a match was determined.

10. The method of claim 9, wherein the external system is the file system client.

11. The method of claim 9, wherein the external system includes a computer system that is different from the file system client and the file system enforcement point.

12. The method of claim 9, wherein the true credentials associated with the declared identity are stored in the external system at a credential path corresponding to the declared identity, the credential path being one of a plurality credential paths each storing credentials corresponding to a unique identity, the task associated with the declared identity is prevented from accessing the credential paths of the plurality of credential paths that do not correspond to the declared identity.

13. A non-transitory computer readable storage medium storing instructions executable by a data processing apparatus in a file system enforcement point and upon such execution cause the data processing apparatus to perform operations comprising:

receiving from a file system client a request to access a distributed file system, the request being associated with a declared identity;

submitting a challenge to the file system client instructing the file system client to retrieve credentials associated with the declared identity, the credentials being accessible at a user credential repository in a path that is accessible only by tasks associated with an account having super user privileges and by tasks associated with the declared identity;

receiving a response to the challenge from the file system client, the response including the credentials retrieved by the file system client from the user credential repository;

retrieving the credentials from the user credential repository using a task associated with an account having super user privileges;

comparing the retrieved credentials with the credentials in the response; and allowing the file system client to access the distributed file system when the retrieved credentials match the credentials in the response.

14. The non-transitory computer readable storage medium of claim 13, wherein the distributed file system is a Hadoop Distributed File System (HDFS), and the file system client is a compute node of a distributed computing system.

15. The non-transitory computer readable storage medium of claim 13, wherein the steps of retrieving and comparing occur once per access session.

16. The non-transitory computer readable storage medium of claim 13, wherein the credentials associated with the declared identity are stored in the user credential repository at a credential path corresponding to the declared identity, the credential path being one of a plurality credential paths each storing credentials corresponding to a unique identity, the tasks associated with the declared identity are prevented from accessing the credential paths of the plurality of credential paths that do not correspond to the declared identity.

17. The non-transitory computer readable storage medium of claim 13, wherein the credential path includes one or more file directory names.

18. A file system enforcement system comprising:

one or more computers and one or more storage devices on which are stored instructions that are operable, when executed by the one or more computers, to cause the one or more computers to perform operations comprising:

receiving from a file system client a first request to access a distributed file system, the request being associated with a declared identity and including purported credentials of the declared identity and wherein true credentials for the declared identity are accessible in a credentials storage system only by tasks associated with an account having super user privileges and by tasks associated with the declared identity;

submitting to the credentials storage system a second request to be provided the true credentials for the declared identity, the second request being made as a super user;

receiving a response to the second request, the response including the true credentials associated with the declared identity;

comparing the true credentials with the purported credentials; and allowing the file system client to access the distributed file system when the true credentials match the purported credentials.

19. The system of claim 18, wherein the credentials storage system includes a directory corresponding to the declared identity and which contains the true credentials, wherein access to the directory is limited by a security measure to only tasks associated with the declared identity or the super user, and wherein the security measure is enforced by an operating system of the credentials storage system.

20. The system of claim 19, wherein the credentials storage system is a portion of the file system client.

* * * * *